United States Patent

Pogson

[11] Patent Number: 6,155,127
[45] Date of Patent: Dec. 5, 2000

[54] CHAINLESS DRIVE MECHANISM

[76] Inventor: Daniel D. Pogson, 23 Woburn Close, Stevenage Hertfordshire, England SG2 8SW, United Kingdom

[21] Appl. No.: 09/262,200

[22] Filed: Mar. 4, 1999

[51] Int. Cl.[7] .................................. F16H 3/22; G05G 1/14
[52] U.S. Cl. .......................... 74/350; 280/260; 74/594.2; 74/594.1
[58] Field of Search ................................ 74/594.1–594.3, 74/350; 280/260

[56] References Cited

U.S. PATENT DOCUMENTS

| | | | |
|---|---|---|---|
| Re. 3,398 | 4/1869 | Purse | 74/350 |
| 267,985 | 11/1882 | Patric | 74/350 |
| 477,095 | 6/1892 | Adams et al. | 74/350 |
| 533,748 | 2/1895 | Robinson | 74/350 |
| 623,780 | 4/1899 | Greiner | 74/350 |
| 813,734 | 2/1906 | Packham et al. | 74/350 |
| 2,378,634 | 6/1945 | Hussey | 74/350 |

*Primary Examiner*—Vinh T. Luong

[57] ABSTRACT

A chainless drive mechanism for transferring power from the pedals to the rear wheel of a bicycle. The chainless drive mechanism has a pedal-driven drive mechanism, a rear drive mechanism for rotating the rear wheel of a bicycle, and a drive shaft being extended between the drive mechanisms. Each of the drive mechanisms has an annular inboard casing, an annular outboard casing, an annular gear wheel and a bevel gear. The annular outboard casings are coupled to the inboard casings. The annular gear wheels are rotatably positioned between the inboard and outboard casings and have a plurality of concentrically geared rings on a side thereof facing the rearward inboard casing. The bevel gears are rotatably disposed between the rearward gear wheels and the rearward inboard casings. The bevel gears engage the geared rings of the gear wheels. The bevel gears engage toothed ends of the drive shaft.

18 Claims, 3 Drawing Sheets

CHAINLESS DRIVE MECHANISM

BACKGROUND OF THE INVENTION

1. Field of the Invention

The present invention relates to bicycle drive mechanisms and more particularly pertains to a new chainless drive mechanism for transferring power from the pedals to the rear wheel of a bicycle.

2. Description of the Prior Art

The use of bicycle drive mechanisms is known in the prior art. More specifically, bicycle drive mechanisms heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle drive mechanisms include U.S. Pat. No. 5,299,819; U.S. Pat. No. 4,005,611; U.S. Pat. No. 4,831,889; U.S. Pat. No. 5,316,327; U.S. Pat. No. 5,482,306; and U.S. Pat. No. 2,181,424.

While these devices fulfill their respective, particular objectives and requirements, the aforementioned patents do not disclose a new chainless drive mechanism. The inventive device includes a pedal-driven drive mechanism, a rear drive mechanism for rotating the rear wheel of a bicycle, and a drive shaft being extended between the drive mechanisms. Each of the drive mechanisms has an annular inboard casing, an annular outboard casing, an annular gear wheel and a bevel gear. The annular inboard casings are adapted for fixed coupling to a portion of a frame of a bicycle. The annular outboard casings are coupled to the inboard casings. The annular gear wheels are rotatably positioned between the inboard and outboard casings and have a plurality of concentrically geared rings on a side thereof facing the rearward inboard casing. The bevel gears are rotatably disposed between the rearward gear wheels and the rearward inboard casings. The bevel gears engage the geared rings of the gear wheels. The bevel gears engage toothed ends of the drive shaft.

In these respects, the chainless drive mechanism according to the present invention substantially departs from the conventional concepts and designs of the prior art, and in so doing provides an apparatus primarily developed for the purpose of transferring power from the pedals to the rear wheel of a bicycle.

SUMMARY OF THE INVENTION

In view of the foregoing disadvantages inherent in the known types of bicycle drive mechanisms now present in the prior art, the present invention provides a new chainless drive mechanism construction wherein the same can be utilized for transferring power from the pedals to the rear wheel of a bicycle.

The general purpose of the present invention, which will be described subsequently in greater detail, is to provide a new chainless drive mechanism apparatus and method which has many of the advantages of the bicycle drive mechanisms mentioned heretofore and many novel features that result in a new chainless drive mechanism which is not anticipated, rendered obvious, suggested, or even implied by any of the prior art bicycle drive mechanisms, either alone or in any combination thereof.

To attain this, the present invention generally comprises a pedal-driven drive mechanism, a rear drive mechanism for rotating the rear wheel of a bicycle, and a drive shaft being extended between the drive mechanisms. Each of the drive mechanisms has an annular inboard casing, an annular outboard casing, an annular gear wheel and a bevel gear. The annular inboard casings are adapted for fixed coupling to a portion of a frame of a bicycle. The annular outboard casings are coupled to the inboard casings. The annular gear wheels are rotatably positioned between the inboard and outboard casings and have a plurality of concentrically geared rings on a side thereof facing the rearward inboard casing. The bevel gears are rotatably disposed between the rearward gear wheels and the rearward inboard casings. The bevel gears engage the geared rings of the gear wheels. The bevel gears engage toothed ends of the drive shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new chainless drive mechanism apparatus and method which has many of the advantages of the bicycle drive mechanisms mentioned heretofore and many novel features that result in a new chainless drive mechanism which is not anticipated, rendered obvious, suggested, or even implied by any of the prior art bicycle drive mechanisms, either alone or in any combination thereof.

It is another object of the present invention to provide a new chainless drive mechanism which may be easily and efficiently manufactured and marketed.

It is a further object of the present invention to provide a new chainless drive mechanism which is of a durable and reliable construction.

An even further object of the present invention is to provide a new chainless drive mechanism which is susceptible of a low cost of manufacture with regard to both materials and labor, and which accordingly is then susceptible of low prices of sale to the consuming public, thereby making such chainless drive mechanism economically available to the buying public.

Still yet another object of the present invention is to provide a new chainless drive mechanism which provides in the apparatuses and methods of the prior art some of the advantages thereof, while simultaneously overcoming some of the disadvantages normally associated therewith.

Still another object of the present invention is to provide a new chainless drive mechanism for transferring power from the pedals to the rear wheel of a bicycle.

Yet another object of the present invention is to provide a new chainless drive mechanism which includes a pedal-driven drive mechanism, a rear drive mechanism for rotating the rear wheel of a bicycle, and a drive shaft being extended between the drive mechanisms. Each of the drive mechanisms has an annular inboard casing, an annular outboard casing, an annular gear wheel and a bevel gear. The annular inboard casings are adapted for fixed coupling to a portion of a frame of a bicycle. The annular outboard casings are coupled to the inboard casings. The annular gear wheels are rotatably positioned between the inboard and outboard casings and have a plurality of concentrically geared rings on a side thereof facing the rearward inboard casing. The bevel gears are rotatably disposed between the rearward gear wheels and the rearward inboard casings. The bevel gears engage the geared rings of the gear wheels. The bevel gears engage toothed ends of the drive shaft.

Still yet another object of the present invention is to provide a new chainless drive mechanism that is cleaner and more reliable than chain-driven bicycles in that there is no oily chain that can slip off of the gears.

Even still another object of the present invention is to provide a new chainless drive mechanism that permits selection of variable gearing ratios.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
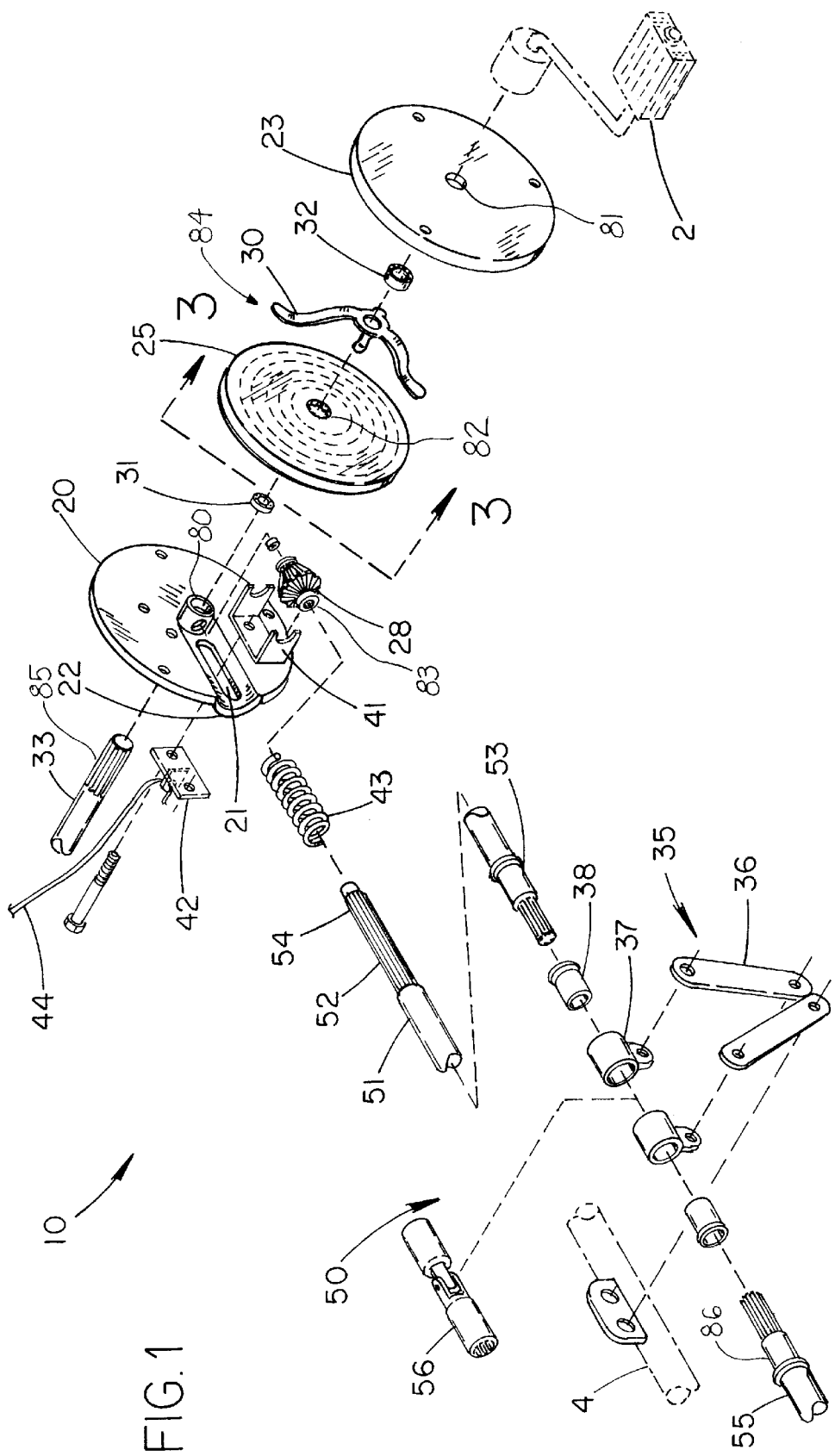
FIG. 1 is an exploded perspective view of a pedal-powered drive mechanism of a new chainless drive mechanism according to the present invention.
Figure 2:
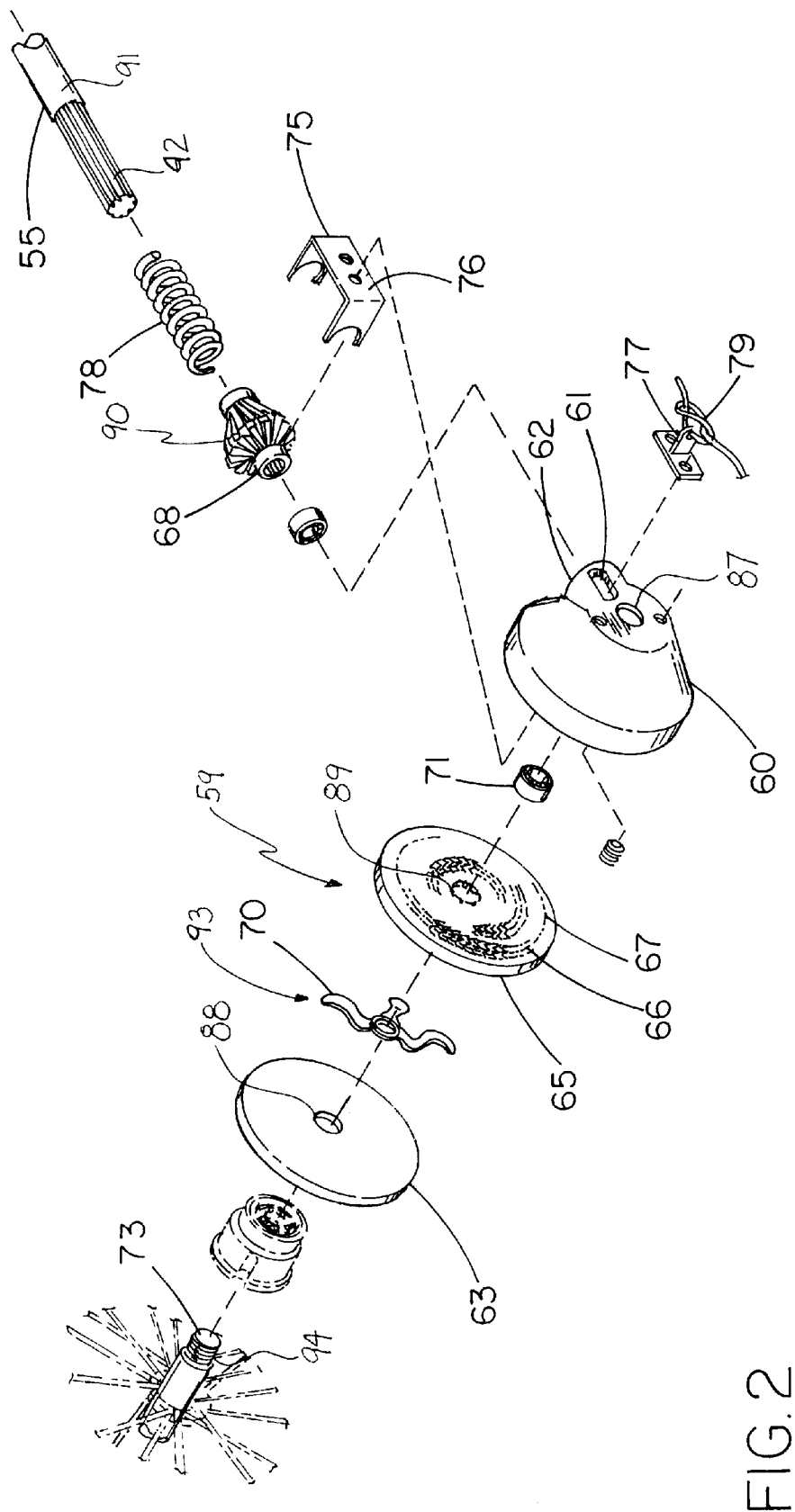
FIG. 2 is a an exploded perspective view of a drive mechanism for the rear wheel of a bicycle of the present invention.
Figure 3:
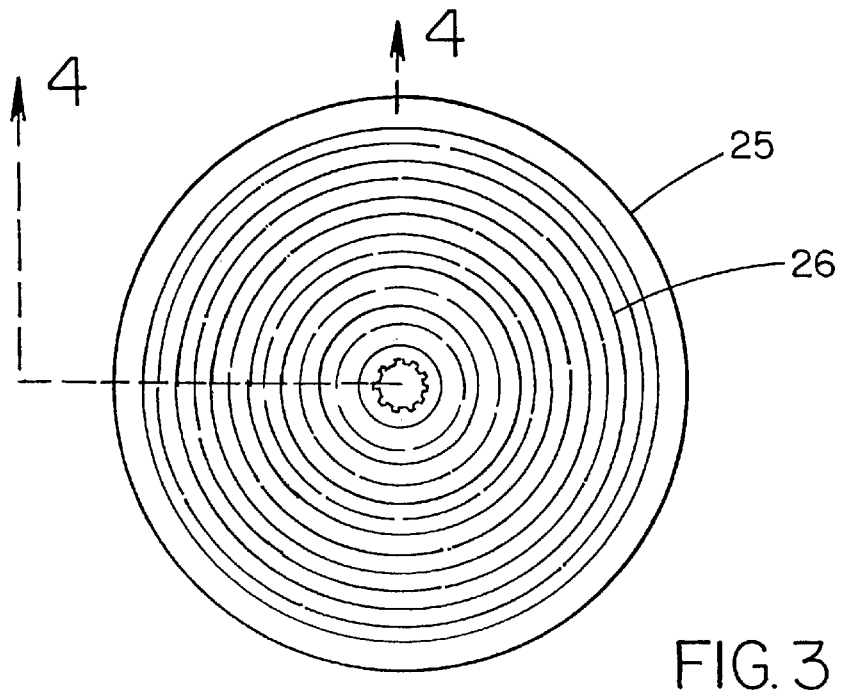
FIG. 3 is a side view of the present invention taken from line 3—3 of FIG. 1.
Figure 4:
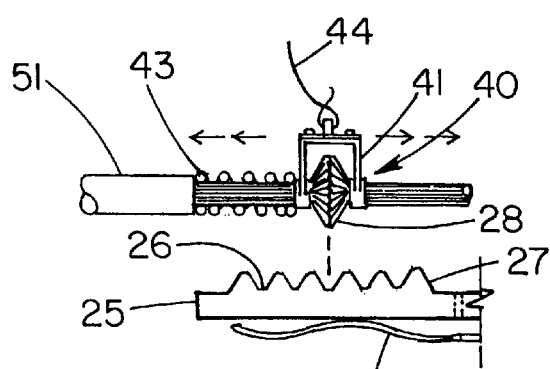
FIG. 4 is a side view of the present invention taken from line 4—4 of FIG. 3.

With reference now to the drawings, and in particular to FIGS. 1 through 5 thereof, a new chainless drive mechanism embodying the principles and concepts of the present invention and generally designated by the reference numeral 10 will be described.

As best illustrated in FIGS. 1 through 5, the chainless drive mechanism 10 comprises an annular forward inboard casing 20 that is adapted for fixed coupling to a central portion of a frame 5 of a bicycle 1. The forward inboard casing 20 has an aperture 80 that extends through its center. An annular forward outboard casing 23 is coupled to the forward inboard casing 20, such as by a plurality of fasteners extending through holes positioned towards an outer perimeter of the forward outboard casing 23. The forward outboard casing 23 also has an aperture 81 that extends through its center.

An annular forward gear wheel 25 is rotatably positioned between the forward inboard casing 20 and the forward outboard casing 23. The forward gear wheel 25 has a plurality of concentrically geared rings 26 on a side thereof facing the forward inboard casing 20 and, preferably, a plurality of ridges 27 that extend from the forward gear wheel 25. Each of the ridges 27 is positioned between a pair of the geared rings 26. Preferably, the forward gear wheel 25 has between about three and ten geared rings 26. Ideally, the forward gear wheel 25 has five geared rings 26. The forward gear wheel 25 has a toothed aperture 82 extending through it.

A forward bevel gear 28 is rotatably disposed between the forward gear wheel 25 and the forward inboard casing 20 and engages the geared rings 26 of the forward gear wheel 25. In the preferred embodiment, the forward bevel gear 28 has about 16 teeth extending from its outer perimeter. Preferably, the forward bevel gear 28 has a toothed aperture extending through it.

Preferably, a first biasing means 84 applies pressure to the geared wheel for pushing the forward gear wheel 25 against the forward bevel gear 28 so that the teeth of the gears don't slip out of mesh with each other. The first biasing means is positioned between the forward gear wheel 25 and the forward outboard casing 23. Ideally, the first biasing means 84 comprising a tri-legged spring 30, as shown in FIG. 1.

Preferably, a first forward bearing 31 is positioned between the forward gear wheel 25 and the forward inboard casing 20. A second forward bearing 32 is positioned between the tri-legged spring 30 and the forward outboard casing 23.

A pedal axle 33 has a geared end region 85 and extends through the apertures of the casings. The geared end region 85 engages the toothed aperture 82 of the forward gear wheel 25. The pedal axle 33 is operatively coupled to a pair of pedals 2.

Preferably, the forward inboard casing 20 has a slot 21 extending through it and an arcuate recess 22 that extends inwardly from the outer perimeter.

A drive shaft means 50 is rotatably coupled to the forward inboard casing 20 and has a toothed portion 54 that is positioned towards an end of it. The forward bevel gear 28 engages the toothed portion 54. The drive shaft means 50 is adapted for engaging a rear drive means 59 for rotating a rear wheel 3 of the bicycle 1.

Preferably, the drive shaft means 50 comprises a forward drive shaft 51 that is rotatably coupled to the forward inboard casing 20 and has first and second ends 52,53. The first end 52 of the forward drive shaft 51 has a toothed portion 54. The first end 52 of the forward drive shaft 51 is slidably disposed in the toothed aperture 83 of the forward bevel gear 28 such that the forward bevel gear 28 is positionable along the toothed portion 54 between the first and second ends 52,53 of the forward drive shaft 51.

Also preferably, a forward bevel gear actuator assembly 40 adjustably positions the forward bevel gear 28 between the aperture 82 and an outer perimeter of the forward gear wheel 25 such that the bevel gear engages different geared rings 26 as it moves between the aperture and the outer perimeter of the forward gear wheel 25 thereby changing the gearing ratio. The forward bevel gear 28 actuator has a gear adjusting member 41 and an outer coupling member 42. The gear adjusting member 41 is rotatably coupled to the forward bevel gear 28 and is slidably coupled to the forward inboard casing 20. The outer coupling member 42 is positioned adjacent an outer surface of the forward inboard casing 20 and is coupled to the gear adjusting member 41 such as by a fastener that extends through the slot 21 in the forward inboard casing 20.

Ideally, the forward drive shaft 51 has a forward tension spring 43 extending around its first end 52. The forward tension spring 43 biases the gear adjusting member 41 towards the aperture of the forward inboard casing 20. Ideally, a forward cable 44 extends between a gearshift handle (not shown) on the handlebars of the bicycle 1 and the forward bevel gear actuator assembly 40 to permit remote positioning of the forward bevel gear 28.

Figure 5:
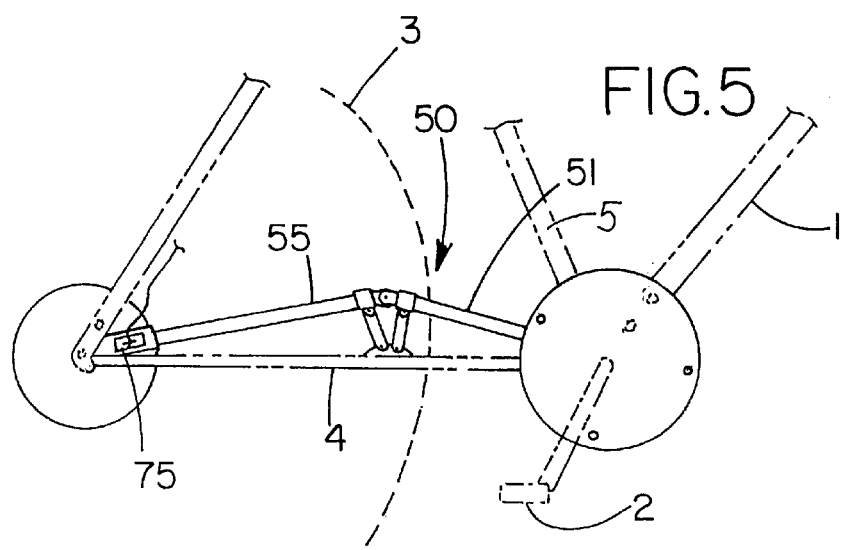
FIG. 5 is a side view of the present invention.

Preferably, a rearward drive shaft 55 is coupled to the forward drive shaft 51. A second end 86 of the rearward drive shaft 55 is coupled to the forward drive shaft 51 by a universal joint 56. Ideally, as seen in FIGS. 1 and 5, a support assembly 35 accommodates the drive shafts above a cross member 4 of the bicycle 1 that extends between the rear wheel 3 and the pedal axle 33, which is especially necessary if the cross member 4 would interfere with the path of the drive shafts between the forward and rearward inboard casings 60. The support assembly 35 has a pair of support bars 36 that extends from the cross member 4 of the bicycle 1. A pair of cylindrical collars 37 is coupled to the support bars 36. A pair of bushings 38 are inserted in the cylindrical collars 37 to reduce friction and create a replaceable point of wear. Ideally, the bushings 38 are made of nylon for reduced weight and inexpensive replacement. The drive shafts extend through the bushings 38 such that the universal joint 56 is positioned between the cylindrical collars 37.

In the preferred embodiment, an annular rearward inboard casing 60 is adapted for fixed coupling to a rear portion of the frame 5 of the bicycle 1. An annular rearward outboard casing 63 is coupled to the rearward inboard casing 60 such as by a plurality of fasteners extending through holes positioned towards an outer perimeter of the rearward outboard casing 63. The rearward inboard and outboard casings 60,63 each have an aperture 87,88 that extends through its center.

An annular rearward gear wheel 65 is rotatably positioned between the rearward inboard casing 60 and the rearward outboard casing 63. The rearward gear wheel 65 has a plurality of concentrically geared rings 66 on a side thereof facing the rearward inboard casing 60. Preferably, a plurality of ridges 67 extend from the rearward gear wheel 65. Ideally, each of the ridges 67 is positioned between a pair of the geared rings 66. Also ideally, the rearward gear wheel 65 has between about two and ten geared rings 66. Most ideally, three geared rings 66 are provided. The rearward gear wheel 65 has a toothed aperture 89 extending through its center. The rearward gear wheel 65 has a smaller outer diameter than the forward gear wheel 25.

A rearward bevel gear 68 is rotatably disposed between the rearward gear wheel 65 and the rearward inboard casing 60. Preferably, the rearward bevel gear 68 has a plurality of teeth 90, ideally about 16 teeth, that extend from its outer perimeter. The teeth 90 of the rearward bevel gear 68 engage the geared rings 66 of the rearward gear wheel 65. Ideally, a first end 91 of the rearward drive shaft 55 has a toothed portion 92 that is slidably disposed in the toothed aperture 89 of the rearward bevel gear 68 such that the rearward bevel gear 68 is positionable along the toothed portion 92 of the rearward drive shaft 55 between opposed ends thereof.

Preferably, a second biasing means 93 applies pressure to the rearward geared wheel 65 for pushing the rearward gear wheel 65 against the rearward bevel gear 68 so that the gears don't slip. The second biasing means 93 is positioned between the rearward geared wheel 65 and the rearward outboard casing 63. Ideally, the second biasing means comprising a tri-legged spring 70.

Ideally, a first rearward bearing 71 is positioned between the rearward gear wheel 65 and the rearward inboard casing 60. A second rearward bearing (not shown) is positioned between the tri-legged spring 70 and the rearward outboard casing 63. A wheel axle 73 has a geared end region 94 and extends through the apertures of the rear casings. The geared end region 94 engages the toothed aperture 89 of the rearward gear wheel 65. The wheel axle 73 is adapted for fixed coupling of a wheel to opposite ends thereof.

Preferably, the rearward inboard casing 60 has a slot 61 extending therethrough and an arcuate recess 62 that extends inwardly from the outer perimeter.

Also preferably, a rearward bevel gear actuator assembly 75 adjustably positions the rearward bevel gear 68 between the aperture and an outer perimeter of the rearward gear wheel 65 such that the bevel gear engages different geared rings 66 as it moves between the aperture 89 and the outer perimeter of the rearward gear wheel 65 thereby changing the gearing ratio. The rearward bevel gear 68 actuator has a gear adjusting member 76 and an outer coupling member 77. The gear adjusting member 76 is rotatably coupled to the rearward bevel gear 68 and is slidably coupled to the rearward inboard casing 60. The outer coupling member 77 is positioned adjacent an outer surface of the rearward inboard casing 60 and is coupled to the gear adjusting member 76 such as by a fastener that extends through the slot 61 in the rearward inboard casing 60.

Ideally, the rearward drive shaft 55 has a rearward tension spring 78 extending around its first end. The rearward tension spring 78 biases the gear adjusting member 76 towards the aperture 87 of the rearward inboard casing 60. Also ideally, a rearward cable 79 extends between a gearshift handle (not shown) on the handlebars of the bicycle 1 and the forward bevel gear actuator assembly 75 to permit remote positioning of the rearward bevel gear 68.

In use, the forward gear wheel 25 is rotated by the pedal axle 33. The forward gear wheel 25 rotates the forward bevel gear 28, which in turn rotates the forward and rearward drive shafts 51,55. The rearward drive shaft 55 rotates the rearward bevel gear 68, which in turn rotates the rearward gear wheel 65. The rearward gear wheel 65 rotates the rear wheel 3 of the bicycle 1. The forward bevel gear 28 actuator assembly 40 permits sliding of the bevel gear between the aperture 82 and the outer perimeter of the forward gear wheel 25 to change the gearing ratio. The forward bevel gear 28 is held on a particular geared ring 26 by the ridges 27. The rearward bevel gear actuator assembly 75 functions in the same way.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chainless drive mechanism for a bicycle, comprising:

an annular forward inboard casing being adapted for fixed coupling to a central portion of a frame of the bicycle, said forward inboard casing having an aperture centrally extending therethrough;

an annular forward outboard casing being coupled to said forward inboard casing, said forward outboard casing having an aperture centrally extending therethrough;

an annular forward gear wheel being rotatably positioned between said forward inboard casing and said forward outboard casing, said forward gear wheel having a plurality of concentrically geared rings on a side thereof facing said forward inboard casing;

a forward bevel gear being rotatably disposed between said forward gear wheel and said forward inboard casing, said forward bevel gear engaging one of said geared rings of said forward gear wheel;

a pedal axle being extended through said apertures of said casings and being fixedly coupled to said forward gear wheel, wherein said pedal axle is operatively coupled to a pair of pedals;

a drive shaft means being rotatably coupled to said forward inboard casing, said drive shaft means having a toothed portion being positioned towards an end thereof, said bevel gear engaging said toothed portion of said, said drive shaft means being adapted for rotating a rear wheel of the bicycle;

wherein said forward gear wheel has said plurality of concentrically geared rings on a side thereof facing said forward inboard casing, said bevel gear engaging said toothed portion such that said bevel gear is positionable along said toothed portion between opposite ends of said drive shaft means;

a forward bevel gear actuator assembly for adjustably positioning said forward bevel gear between said aperture and an outer perimeter of said forward gear wheel such that said bevel gear engages different geared rings as said forward gear wheel moves between said aperture and said outer perimeter of said forward gear wheel, said forward bevel gear actuator having a gear adjusting member and an outer coupling member, said gear adjusting member being rotatably coupled to said forward bevel gear and being slidably coupled to said forward inboard casing, said outer coupling member being positioned adjacent an outer surface of said forward inboard casing and being coupled to said gear adjusting member; and wherein said drive shaft means has a forward tension spring being extended around said toothed portion thereof, said forward tension spring being for biasing said gear adjusting member towards said aperture of said forward inboard casing.

2. The drive mechanism of claim 1, wherein said forward gear wheel has a plurality of ridges extending from said forward gear wheel, each of said ridges being positioned between a pair of said geared rings, said forward gear wheel having a toothed aperture extending therethrough.

3. The drive mechanism of claim 1, wherein said forward gear wheel has between about three and ten concentrically geared rings.

4. The drive mechanism of claim 1, wherein said forward bevel gear has a toothed aperture extending therethrough, said toothed portion of said drive shaft means being slidably disposed in said toothed aperture of said forward bevel gear such that said bevel gear is slidably positionable along said toothed portion of said drive shaft means between opposite ends thereof.

5. The drive mechanism of claim 1, further comprising a first biasing means for pushing said forward gear wheel against said forward bevel gear, said first biasing means being positioned between said geared ring and said forward outboard casing.

6. The drive mechanism of claim 5, wherein said first biasing means comprises a tri-legged spring.

7. The drive mechanism of claim 1, further comprising an annular rearward inboard casing, an annular rearward outboard casing, an annular rearward gear wheel and a rearward bevel gear, said annular rearward inboard casing being adapted for fixed coupling to a rear portion of the frame of the bicycle, said annular rearward outboard casing being coupled to said rearward inboard casing, said rearward inboard and outboard casings each having an aperture centrally extending therethrough, said annular rearward gear wheel being rotatably positioned between said rearward inboard casing and said rearward outboard casing, said rearward gear wheel having a plurality of concentrically geared rings on a side thereof facing said rearward inboard casing, said rearward gear wheel being operatively coupled to the rear wheel of the bicycle, said rearward bevel gear being rotatably disposed between said rearward gear wheel and said rearward inboard casing, said rearward bevel gear engaging said geared rings of said rearward gear wheel, said rearward bevel gear engaging a second toothed end of said drive shaft means.

8. The drive mechanism of claim 7, wherein the annular rearward gear wheel has a plurality of ridges extending from said rearward gear wheel, each of said ridges being positioned between a pair of said geared rings, said rearward gear wheel having a toothed aperture extending therethrough.

9. The drive mechanism of claim 7, wherein the annular rearward gear wheel has three concentrically geared rings.

10. The drive mechanism of claim 7, further comprising a rearward bevel gear actuator assembly for adjustably positioning said rearward bevel gear between said aperture and an outer perimeter of said rearward gear wheel such that said bevel gear engages different geared rings as rearward bevel gear moves between said aperture and said outer perimeter of said rearward gear wheel, said rearward bevel gear actuator having a gear adjusting member and an outer coupling member, said gear adjusting member being rotatably coupled to said rearward bevel gear and being slidably coupled to said rearward inboard casing, said outer coupling member being positioned adjacent an outer surface of said rearward inboard casing and being coupled to said gear adjusting member.

11. The drive mechanism of claim 10, wherein said drive shaft means has a forward tension spring being extended around said second toothed portion of said drive shaft means, said rearward tension spring being for biasing said gear adjusting member towards said aperture of said rearward inboard casing.

12. The drive mechanism of claim 7, further comprising a second biasing means for pushing said rearward gear wheel against said rearward bevel gear, said second biasing means being positioned between said geared ring and said rearward outboard casing, said second biasing means comprising a tri-legged spring.

13. The drive mechanism of claim 7, wherein said rearward bevel gear has a toothed aperture extending therethrough, said second toothed portion of said drive shaft means being slidably disposed in said toothed aperture of said rearward bevel gear such that said bevel gear is slidably positionable along said second toothed portion of said drive shaft means between opposite ends thereof.

14. The drive mechanism of claim 7, wherein said drive shaft means comprises a forward drive shaft and a rearward drive shaft being coupled to said forward drive shaft by a universal joint, said rearward bevel gear engaging a toothed portion of said second drive shaft.

15. The drive mechanism of claim 14, wherein said drive shaft means further comprises a support assembly for accommodating said drive shafts above a cross member of the bicycle extending between the rear wheel and the pedal axle, said support assembly having a pair of support bars being extended from the cross member of the bicycle, a pair of cylindrical collars being coupled to said support bars, and a pair of bushings being inserted in said cylindrical collars, said drive shafts extending through said bushings such that said universal joint is positioned between said cylindrical collars.

16. The chainless drive mechanism of claim 1, further comprising:
- a plurality of ridges extending from said forward gear wheel, each of said ridges being positioned between a pair of said geared rings, said forward gear wheel having a toothed aperture extending therethrough;
- said forward bevel gear having a toothed aperture extending therethrough;
- a first biasing means for pushing said forward gear wheel against said forward bevel gear, said first biasing means being positioned between said geared ring and said forward outboard casing, said first biasing means comprising a tri-legged spring;
- a first forward bearing being positioned between said forward gear wheel and said forward inboard casing;
- a second forward bearing being positioned between said tri-legged spring and said forward outboard casing;
- said pedal axle having a geared end region said geared end region engaging said toothed aperture of said forward gear wheel;
- said drive shaft means comprising a forward drive shaft;
- said forward drive shaft having first and second ends, said first end of said forward drive shaft having a toothed portion being slidably disposed in said toothed aperture of said forward bevel gear such that said forward bevel gear is positionable along said toothed portion of said first end of said forward drive shaft between said first and second ends of said forward drive shaft;
- said forward drive shaft having a forward tension spring being extended around said first end thereof;
- a rearward drive shaft having first and second ends, said second end of said rearward drive shaft being coupled to said forward drive shaft by a universal joint, said first end of said rearward drive shaft being rotatably coupled to said rearward inboard casing, said first end of said rearward drive shaft having a toothed portion;
- a support assembly for accommodating said drive shafts above a cross member of the bicycle extending between the rear wheel and the pedal axle, said support assembly having a pair of support bars being extended from the cross member of the bicycle, a pair of cylindrical collars being coupled to said support bars, and a pair of bushings being inserted in said cylindrical collars, said drive shafts extending through said bushings such that said universal joint is positioned between said cylindrical collars;
- an annular rearward inboard casing being adapted for fixed coupling to a rear portion of the frame of the bicycle, said rearward inboard casing having an aperture centrally extending therethrough;
- an annular rearward outboard casing being coupled to said rearward inboard casing, said rearward outboard casing having an aperture centrally extending therethrough;
- an annular rearward gear wheel being rotatably positioned between said rearward inboard casing and said rearward outboard casing, said rearward gear wheel having a plurality of concentrically geared rings on a side thereof facing said rearward inboard casing and a plurality of ridges extending from said rearward gear wheel, each of said ridges being positioned between a pair of said geared rings, said rearward gear wheel having a toothed aperture extending therethrough;
- a rearward bevel gear being rotatably disposed between said rearward gear wheel and said rearward inboard casing, said rearward bevel gear engaging said geared rings of said rearward gear wheel, said rearward bevel gear engaging said toothed portion such that said rearward bevel gear is positionable along a toothed portion of said second drive shaft between opposed ends thereof, said rearward bevel gear having a toothed aperture extending therethrough;
- said first end of said rearward drive shaft being slidably disposed in said toothed aperture of said rearward bevel gear such that said rearward bevel gear is positionable along said toothed portion of said first end of said rearward drive shaft between said first and second ends of said rearward drive shaft;
- a second biasing means for pushing said rearward gear wheel against said rearward bevel gear, said second biasing means being positioned between said geared ring and said rearward outboard casing, said second biasing means comprising a tri-legged spring;
- a first rearward bearing being positioned between said rearward gear wheel and said rearward inboard casing;
- a wheel axle having a geared end region and being extended through said apertures of said rear casings, said geared end region engaging said toothed aperture of said rearward gear wheel, wherein said wheel axle is adapted for fixed coupling of a wheel to opposite ends thereof;
- a rearward bevel gear actuator assembly for adjustably positioning said rearward bevel gear between said aperture and an outer perimeter of said rearward gear wheel such that said bevel gear engages different geared rings as it moves between said aperture and said outer perimeter of said rearward gear wheel, said rearward bevel gear actuator having a gear adjusting member and an outer coupling member;

said gear adjusting member being rotatably coupled to said rearward bevel gear and being slidably coupled to said rearward inboard casing, said outer coupling member being positioned adjacent an outer surface of said rearward inboard casing and being coupled to said gear adjusting member; and said rearward drive shaft having a rearward tension spring being extended around said first end thereof, said rearward tension spring being for biasing said gear adjusting member towards said aperture of said rearward inboard casing.

17. A chainless drive mechanism for a bicycle, comprising:

an annular forward inboard casing being adapted for fixed coupling to a central portion of a frame of the bicycle, said forward inboard casing having an aperture centrally extending therethrough;

an annular forward outboard casing being coupled to said forward inboard casing, said forward outboard casing having an aperture centrally extending therethrough;

an annular forward gear wheel being rotatably positioned between said forward inboard casing and said forward outboard casing, said forward gear wheel having a plurality of concentrically geared rings on a side thereof facing said forward inboard casing;

a forward bevel gear being rotatably disposed between said forward gear wheel and said forward inboard casing, said forward bevel gear engaging one of said geared rings of said forward gear wheel;

a pedal axle being extended through said apertures of said casings and being fixedly coupled to said forward gear wheel, wherein said pedal axle is operatively coupled to a pair of pedals;

a drive shaft means being rotatably coupled to said forward inboard casing, said drive shaft means having a toothed portion being positioned towards an end thereof, said bevel gear engaging said toothed portion of said, said drive shaft means being adapted for rotating a rear wheel of the bicycle;

an annular rearward inboard casing, an annular rearward outboard casing, an annular rearward gear wheel and a rearward bevel gear, said annular rearward inboard casing being adapted for fixed coupling to a rear portion of the frame of the bicycle, said annular rearward outboard casing being coupled to said rearward inboard casing, said rearward inboard and outboard casings each having an aperture centrally extending therethrough, said annular rearward gear wheel being rotatably positioned between said rearward inboard casing and said rearward outboard casing, said rearward gear wheel having a plurality of concentrically geared rings on a side thereof facing said rearward inboard casing, said rearward gear wheel being operatively coupled to the rear wheel of the bicycle, said rearward bevel gear being rotatably disposed between said rearward gear wheel and said rearward inboard casing, said rearward bevel gear engaging said geared rings of said rearward gear wheel, said rearward bevel gear engaging a second toothed end of said drive shaft means;

a rearward bevel gear actuator assembly for adjustably positioning said rearward bevel gear between said aperture and an outer perimeter of said rearward gear wheel such that said bevel gear engages different geared rings as rearward bevel gear moves between said aperture and said outer perimeter of said rearward gear wheel, said rearward bevel gear actuator having a gear adjusting member and an outer coupling member, said gear adjusting member being rotatably coupled to said rearward bevel gear and being slidably coupled to said rearward inboard casing, said outer coupling member being positioned adjacent an outer surface of said rearward inboard casing and being coupled to said gear adjusting member; and wherein said drive shaft means has a forward tension spring being extended around said second toothed portion of said drive shaft means, said rearward tension spring being for biasing said gear adjusting member towards said aperture of said rearward inboard casing.

18. A chainless drive mechanism for a bicycle, comprising:

an annular forward inboard casing being adapted for fixed coupling to a central portion of a frame of the bicycle, said forward inboard casing having an aperture centrally extending therethrough;

an annular forward outboard casing being coupled to said forward inboard casing, said forward outboard casing having an aperture centrally extending therethrough;

an annular forward gear wheel being rotatably positioned between said forward inboard casing and said forward outboard casing, said forward gear wheel having a plurality of concentrically geared rings on a side thereof facing said forward inboard casing;

a forward bevel gear being rotatably disposed between said forward gear wheel and said forward inboard casing, said forward bevel gear engaging one of said geared rings of said forward gear wheel;

a pedal axle being extended through said apertures of said casings and being fixedly coupled to said forward gear wheel, wherein said pedal axle is operatively coupled to a pair of pedals;

a drive shaft means being rotatably coupled to said forward inboard casing, said drive shaft means having a toothed portion being positioned towards an end thereof, said bevel gear engaging said toothed portion of said, said drive shaft means being adapted for rotating a rear wheel of the bicycle;

an annular rearward inboard casing, an annular rearward outboard casing, an annular rearward gear wheel and a rearward bevel gear, said annular rearward inboard casing being adapted for fixed coupling to a rear portion of the frame of the bicycle, said annular rearward outboard casing being coupled to said rearward inboard casing, said rearward inboard and outboard casings each having an aperture centrally extending therethrough, said annular rearward gear wheel being rotatably positioned between said rearward inboard casing and said rearward outboard casing, said rearward gear wheel having a plurality of concentrically geared rings on a side thereof facing said rearward inboard casing, said rearward gear wheel being operatively coupled to the rear wheel of the bicycle, said rearward bevel gear being rotatably disposed between said rearward gear wheel and said rearward inboard casing, said rearward bevel gear engaging said geared rings of said rearward gear wheel, said rearward bevel gear engaging a second toothed end of said drive shaft means; and wherein said drive shaft means comprises a forward drive shaft and a rearward drive shaft being coupled to said forward drive shaft by a universal joint, said rearward bevel gear engaging a toothed portion of said second drive shaft.

* * * * *